United States Patent [19]

Small

[11] Patent Number: 4,660,631
[45] Date of Patent: Apr. 28, 1987

[54] BAFFLE

[75] Inventor: William M. Small, Bartlesville, Okla.

[73] Assignee: Phillips Petroleum Company, Del.

[21] Appl. No.: 737,838

[22] Filed: May 28, 1985

Related U.S. Application Data

[63] Continuation of Ser. No. 144,086, Apr. 28, 1980, abandoned.

[51] Int. Cl.⁴ .............................................. F28D 7/00
[52] U.S. Cl. .................................... 165/159; 165/162
[58] Field of Search ..................... 165/159, 161, 162

[56] References Cited

U.S. PATENT DOCUMENTS 2,595,822  5/1952  Uggerby .............................. 165/159
4,136,736  1/1979  Small .................................. 165/162

FOREIGN PATENT DOCUMENTS 2339364   2/1975   Fed. Rep. of Germany ...... 165/159
2657666  12/1977   Fed. Rep. of Germany ...... 165/159
 757633   9/1956   United Kingdom ............... 165/159
 915905   1/1963   United Kingdom ............... 165/159

Primary Examiner—Albert W. Davis, Jr.
Assistant Examiner—Peggy Neils
Attorney, Agent, or Firm—A. W. Umphlett

[57] ABSTRACT

A baffle is mounted in a ring having a beveled edge to facilitate movement in a direction normal to the plane of the baffle.

32 Claims, 17 Drawing Figures

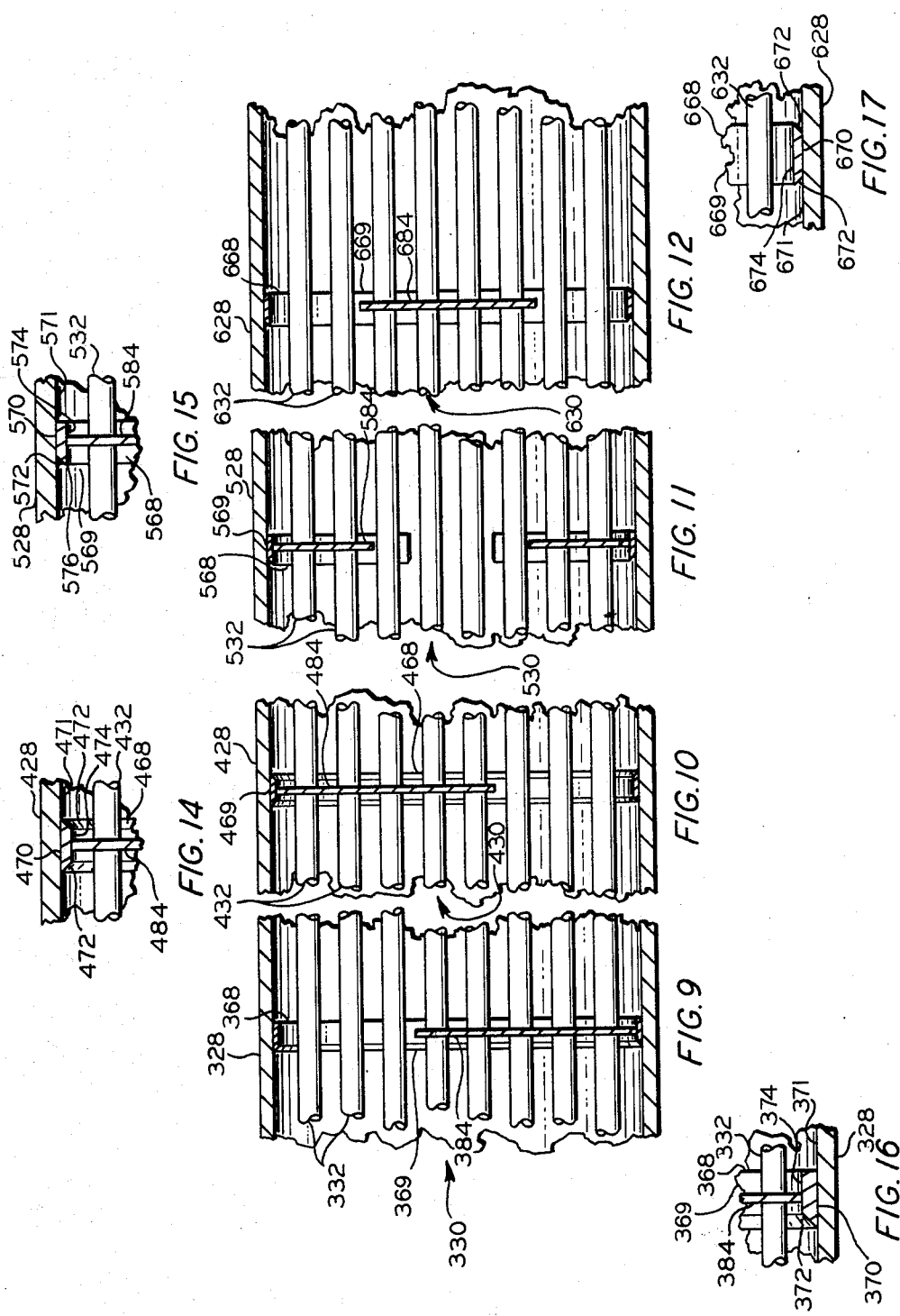

//BAFFLE

This application is a continuation of co-pending application Ser. No. 144,086, filed Apr. 28, 1980, now abandoned.

BACKGROUND OF THE INVENTION

In one aspect, the invention relates to an improvement to a baffle. In another aspect, the invention relates to an improved baffle cage. In another aspect, the invention relates to an improved tube bundle. In yet another aspect, the invention relates to an improved heat exchanger. In still another aspect, the invention relates to removing a tube bundle from a heat exchanger shell.

Deposits on the internal surfaces of heat exchangers have long been a major problem in the art. Besides decreasing the heat transfer capabilities of the heat exchanger, severe deposits also decrease throughput and raise the pressure drop, making the heat exchanger more expensive to operate due to higher pumping costs and less efficient heat transfer. Deposits also create problems during the disassembly of heat exchangers for maintenance or repair.

For example, in shell and tube heat exchangers used in acid services, the deposits can become so severe that the tube bundle is effectively cemented into the shell. The cost of cleaning the unit or repairing even a small leak in such a locked-up unit can be staggering, because the bundle is often destroyed by intention or by accident when it is attempted to remove it from its shell.

It would thus be extremely desirable to provide a heat exchanger which is easily dismantled for cleaning or repair, despite the presence of profuse deposits on its interior surfaces. It would also be extremely desirable to provide such a readily dismantled heat exchanger in which available components are utilized to a large extent, thus minimizing the costs of its implementation.

OBJECTS OF THE INVENTION

It is thus an object of this invention to provide a baffle which is easily removed from a shell despite the presence of deposits on the interior surfaces and particularly the interior surfaces of the shell.

It is a further object of this invention to accomplish the above object with maximal economy.

SUMMARY OF THE INVENTION

According to one embodiment of the invention, a baffle is provided which comprises a ring having a surface to be positioned contiguous to a shell and a beveled surface which intersects with the surface to be positioned contiguous to the shell, and baffle means in cooperation with the ring and at least partially traversing the diameter defined by the ring.

According to another embodiment of the invention, a baffle cage comprises a plurality of the above-described baffles arranged in a plurality of parallel planes and centered about a common axis, and at least one longitudinal member parallel to the common axis which establishes cooperation between the rings.

According to another embodiment of the invention, a tube bundle comprises a plurality of tubes arranged so as to form a tube bundle, tube support means at least partially traversing the longitudinal dimension of the tube bundle to support the tubes, and a ring in cooperation with the tube support means and at least partially surrounding the tube bundle, the ring having a first surface to be positioned contiguous to a shell and a beveled surface which intersects with the first surface.

In this embodiment, the ring supports the tube handle in the heat exchanger shell. When it is desired to remove the bundle from the shell, the beveled surface of the ring acts as a wedge against deposits on the inside of the heat exchanger shell to either dislodge the deposits and force them to the inside of the ring or collapse the ring into the tube bundle so that it rides out over the deposits. Employing either alternative, the tube bundle can be quickly and inexpensively removed from the heat exchanger shell.

BRIEF DESCRIPTION OF THE DRAWINGS

FIG. 9 is an elevational view of a portion of a heat exchanger employing another embodiment of the present invention.

FIG. 10 is an elevational view of a portion of a heat exchanger employing another embodiment of the present invention.

FIG. 11 is an elevational view of a portion of a heat exchanger employing another embodiment of the present invention.

FIG. 12 is an elevational view of a portion of a heat exchanger employing another embodiment of the present invention.

FIG. 14 is an enlarged view of a fragment of the apparatus shown in FIG. 10.

FIG. 15 is an enlarged view of a fragment of the apparatus shown in FIG. 11.

FIG. 16 is an enlarged view of a fragment of the apparatus shown in FIG. 9.

FIG. 17 is an enlarged view of a fragment of the apparatus shown in FIG. 12.

DETAILED DESCRIPTION OF THE INVENTION

Figure 1:
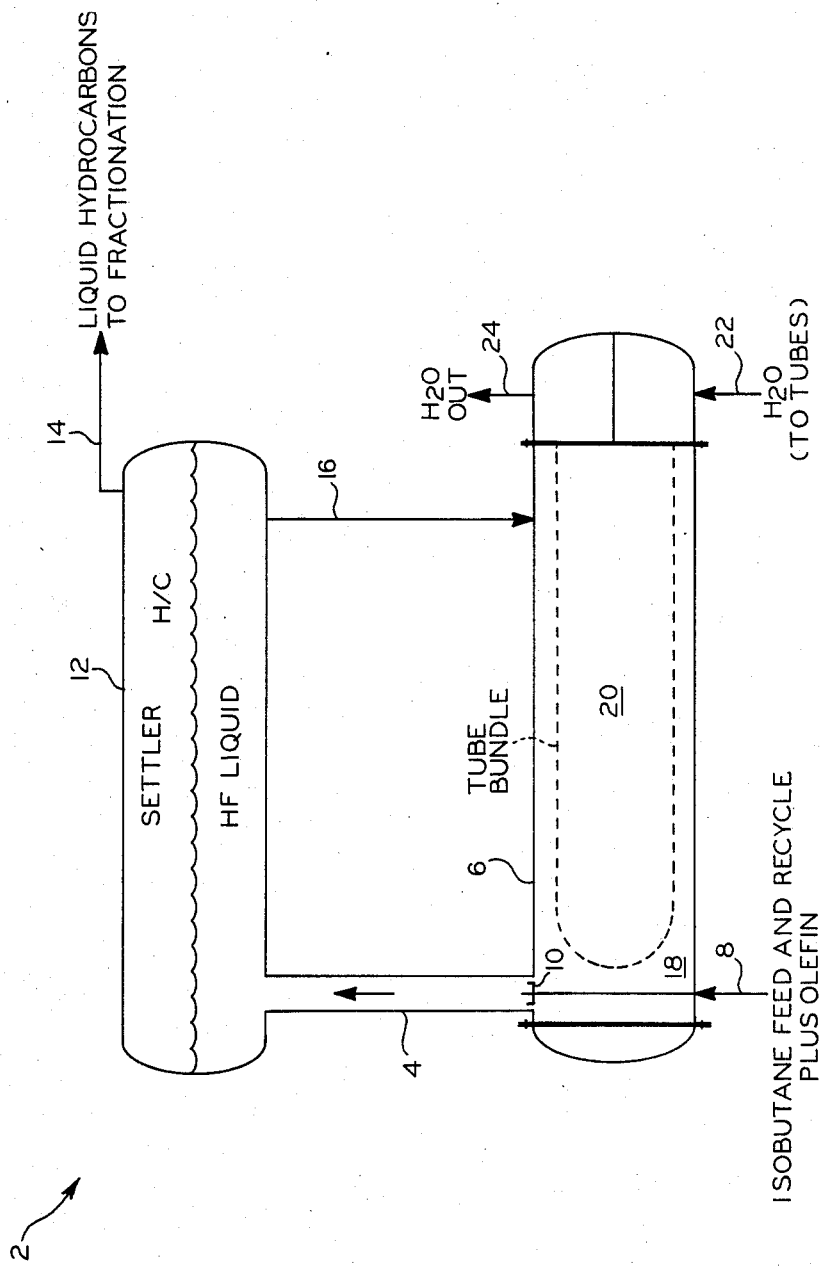
FIG. 1 is a schematic of a portion of an HF alkylation unit suitable for employing the present invention.

FIG. 1 illustrates a schematic for a hydrofluoric acid catalyst (hereinafter HF) alkylation process. The alkylation schematic, designated generally by 2, comprises a riser-reactor 4, a settler vessel 12, an HF return line 16, and an acid cooler 6. HF from cooler 6 is introduced into riser-reactor 4 and there contacted with a mixture of olefin and isobutane introduced into reactor 4 from line 8 via nozzle 10. The reaction mixture empties into the settler 12 from line 4, and separates into an upper liquid hydrocarbon phase rich in alkylate and unreacted isobutane and a lower liquid phase rich in HF catalyst. The hydrocarbon phase is withdrawn from settler 12 via a line 14, while the lower liquid phase is discharged as a bottoms stream to line 16, which establishes a flowpath between settler 12 and acid cooler 6. Generally, unreacted isobutane from line 14 is separated from the alkylate and recycled to line 8.

The acid cooler 6 is divided into a shell side 18 and a tube side 20. Indirect heat transfer occurs between HF catalyst liquid introduced into the shell side 18 via line 16 and water introduced into the tube side via a line 22. The HF flows through the shell side 18 from line 16 to riser 4. It is reintroduced into riser 4 to again serve as alkylation catalyst. Generally, the HF flowing through shell side 18 is forced to follow a tortuous flow path, as tortuous flow improves heat transfer between the shell side and tube side fluid. The cooling water introduced into the acid cooler via line 22 flows through the tube side 20 of the acid cooler 6 and is discharged via a line 24. As the apparatus operates, deposits accumulate in the shell side 18 of acid cooler 6 and on the outer surfaces of the tubes, decreasing its ability to cool the acid.

Figures 2, 13:
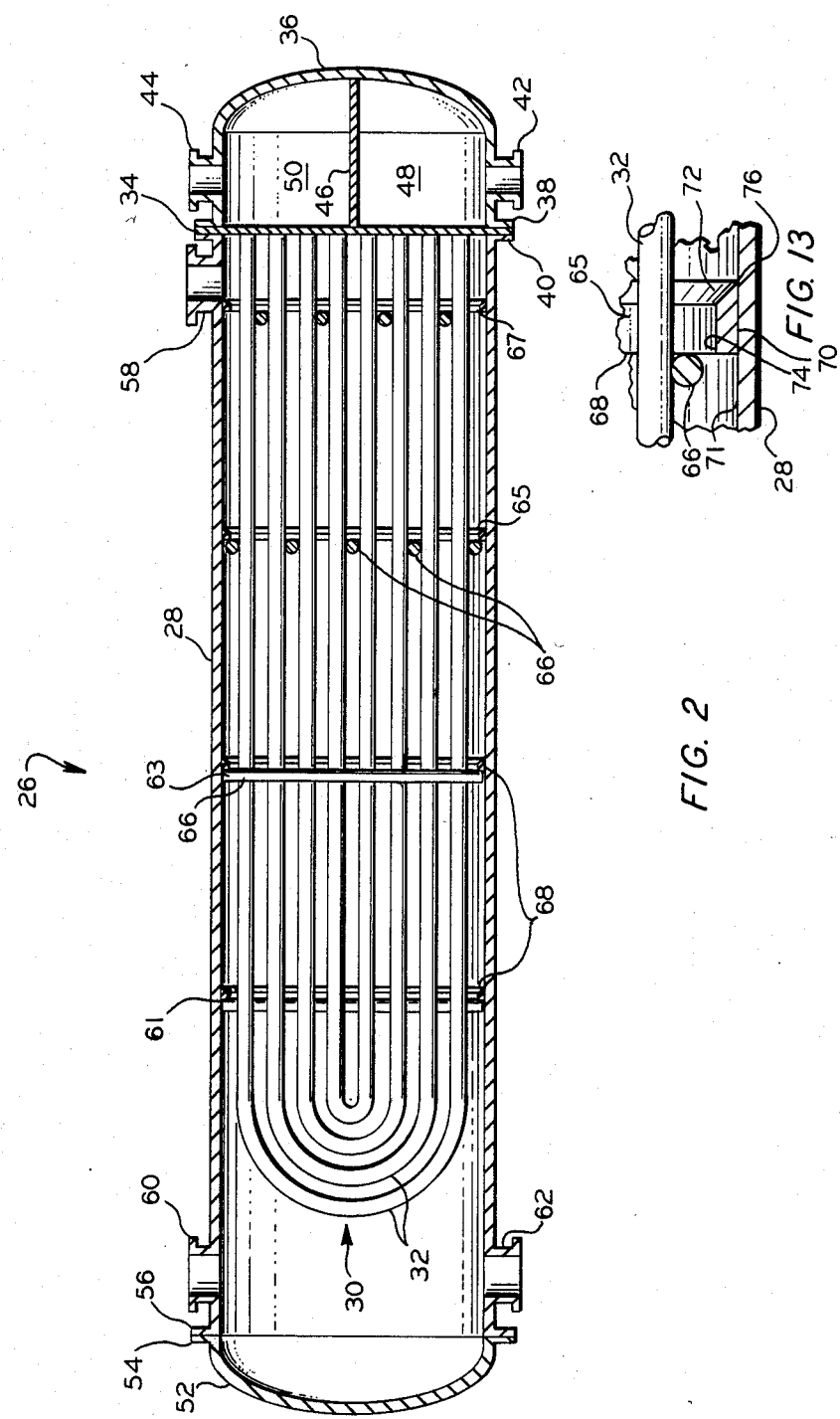
FIG. 2 is an elevational view of a heat exchanger employing one embodiment of the present invention.
FIG. 13 is an enlarged view of a fragment of the apparatus shown in FIG. 2.
Figure 3:
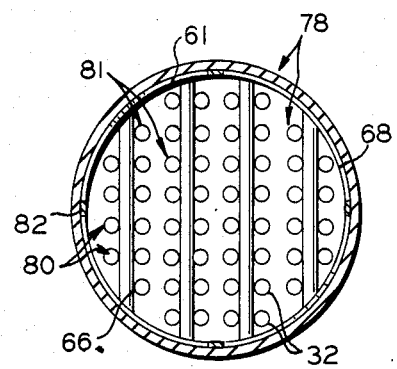
FIG. 3 is a plan representation of baffle 61 of FIG. 2.
Figure 4:
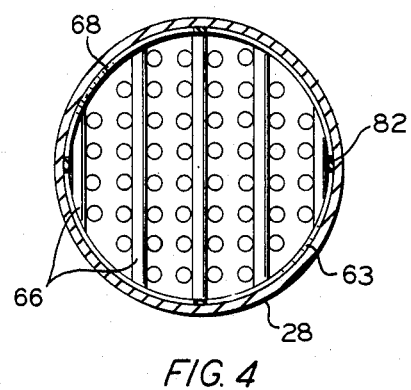
FIG. 4 is a plan representation of baffle 63 of FIG. 2.
Figure 5:
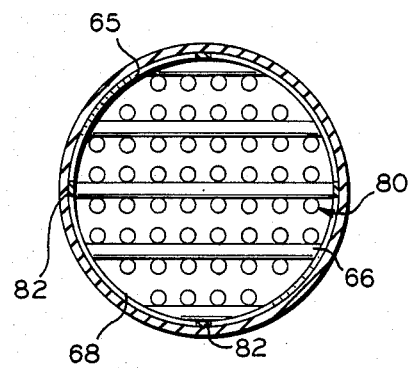
FIG. 5 is a plan representation of baffle 65 of FIG. 2.
Figure 6:
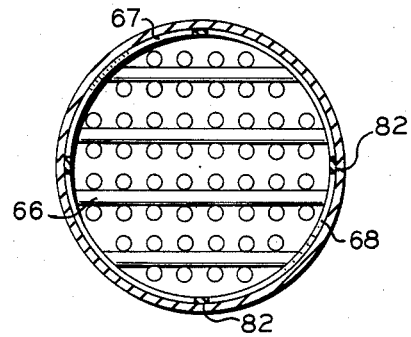
FIG. 6 is a plan representation of baffle 67 of FIG. 2.

FIG. 2 is a more detailed illustration of a heat exchanger 26 employing one embodiment of the present invention which can be utilized as the acid cooler 6 of FIG. 1. The heat exchanger 26 comprises a tube bundle 30 surrounded by a heat exchanger shell 28.

The heat exchanger shell, as illustrated, is equipped with a head 36 and an end closure 52. Head 36 is affixed to the generally cylindrical central portion of the heat exchanger shell by affixation via its head flange 38 to an end flange 40 of the cylindrical portion of the shell. End closure 52 is affixed to the generally cylindrical portion of the shell by affixation of its shell end closure flange 54 to shell end flange 56 of the generally cylindrical portion of the shell. Affixation can be with bolts and it is advisable to employ gaskets (not illustrated) between the mating surfaces. A typical shell can be constructed of corrosion-resistant steel, and can be, for example, 5 feet in diameter and 25 to 50 feet in length, depending on the heat exchange capacity needed and the service to which it is to be employed.

As illustrated, the generally cylindrical portion of shell 28 is equipped with an inlet nozzle 58 and an outlet nozzle 60 for flow of fluid through the shell side of the heat exchanger. The illustrated apparatus is additionally provided with an aperture 62 in axial alignment with outlet nozzle 60, for passage of a feed line 8 as in FIG. 1 through the reactor to discharge into a riser-reactor. An inlet nozzle 42 and an outlet nozzle 44 communicate with the heat exchanger head 36, with a Partition 46 blocking direct communication therebetween and dividing the heat exchanger head 36 into sections 48 and 50.

The tube bundle 30 is located longitudinally within the generally cylindrical portion of the heat exchanger shell 28. The tube bundle 30 is comprised of a plurality of tubes 32 arranged in parallel for convenience. The tube bundle 30 carries tube side fluid introduced into the heat exchanger via nozzle 42 in an indirect heat transfer relationship with shell side fluid introduced via nozzle 58. The tubes 32 are affixed by their ends through apertures in a tube sheet 34, an outside annular portion of which is mounted between head flange 38 and shell head flange 40 of the heat exchanger shell 28. The tube sheet 34 seals sections 48 and 50 of head 36 from shell side fluid introduced into the generally cylindrical portion of the shell 28 via nozzle 58. The tubes 32 establish pathways between sections 48 and 50 of the heat exchanger head 36 via a 180° change of direction near the end of the heat exchanger opposite tube sheet 34, although it is to be understood that the present invention is also applicable to tube bundles sandwiched between two tube sheets, one at each end of the exchanger. A typical tube bundle can comprise 500 tubes or more with each tube having for example, a one-inch diameter, and being about 40 to 100 feet in length. Usually, the tubes are constructed from a corrosion-resistant, heat transmissive material, for example, corrosion-resistant steel. Tube bundles usually exhibit a generally circular cross section, for convenience, and generally have diameters ranging from 2 feet to about 20 feet, usually about 3 to about 8 feet, with the distance between the tubes being usually about 25 percent or less of the diameter of the tubes.

Baffles 61, 63, 65 and 67 at least partially traverse the inside diameter of the shell 28. Each baffle comprises a ring 68 the diameter of which is at least partially traversed by baffle means, such as illustrated rods 66. Plate baffles, for example, as shown by FIGS. 9–12, can also be suitably employed as baffle means. Generally, the baffle means which are at least partially surrounded by a ring 68 are constructed so as to cause fluid flowing through the shell 28 to follow a tortuous path from inlet 58 to outlet 60.

In the embodiment of the invention shown best by FIGS. 2–6 and 13, the ring 68 is positioned contiguous to an interior surface 71 of the shell 28. The ring 68 at least partially surrounds the tube bundle 30. The rods 66, as best seen in FIGS. 3–6, extend at least partially across the ring as a series of parallel chords. To facilitate passing the rods through the tube bundle 30, the tubes 32 of the bundle 30 are laid out in a square pitch array, although other tube layouts can be utilized, if desired. The parallel tubes 32 of bundles 30 are arranged in at least a first plurality of parallel tube rows 78 (vertical rows as illustrated) and a second plurality of parallel tube rows 80 (horizontal rows as illustrated. Other tube rows, for example a diagonal row which passes through the tubes designated by numeral 81 of FIG. 3, may also be present in the bundle.

Referring to FIGS. 2 and 13, a ring 68 at least partially surrounds the tube bundle 30. Baffle means, for example, rods 66, cooperate with the ring and support the tubes 32. The ring, in combination with the baffle means, forms a baffle, for example, a baffle 65 shown by FIGS. 2, 5 and 13. The ring 68 has an outer surface 70 positioned contiguous to an interior surface 71 of heat exchanger shell 28 and a substantially beveled surface 72 which intersects with the surface 70. The ring 68 has an inner surface 74. Generally, the beveled surface 72 will be on that end of the ring facing the direction in which bundle 30 is to be removed from shell 28. If desired, both ends of the ring can be equipped with a beveled surface. The beveled surface of the ring wedges against deposits which accumulate on an inside surface 71 of shell 28, when the bundle 30 is pulled from shell 28. To this end, surface 72 need be only substantially beveled, it being sufficient that the beveled surface forms a taper with respect to either inner surface 74 or contiguous surface 70 of the ring 68. Preferably, the taper terminates in a leading knife edge 76 on one end of the ring 68, and the bundle 30 is pulled from shell 28 knife edge 76 first.

The ring 68 is conveniently formed from stock having a length which will yield the desired circumference. Bar stock is preferred for convenience, for example, bar stock having a width of between about one inch and six inches and a thickness between about one-fourth inch and one inch, for example, $1\frac{1}{2}'' \times \frac{3}{4}''$ bar stock. One or more longitudinal corners of the bar stock is removed, for example, by grinding or cutting, to form a bevel or chamfer and the stock is then formed into the ring.

Preferably, the leading edge 76 of the ring 68 is defined by two "flat" surfaces of the ring meeting at an acute angle, for example, between 10° and 80°, usually between about 30° and 60°. "Flat" refers to the appearance of the surfaces when the ring is taken in cross section across its diameter. The beveled surface on the ring preferably defines at least a portion of a frustoconical shape converging toward an axis through the center of the ring, which, when the ring is located around a tube bundle, corresponds to the longitudinal axis of the bundle. The half angle of convergence of the frustocone is generally between about 10° and 80°, usually between about 30° and 60°. The beveled surface 72 of the ring can either face the tube bundle 30, as shown by the reference numeral 72 in FIG. 13, or face the interior surface of the shell, as shown by the reference numeral 672, in, for example, FIG. 17. The equipping of the ring 68 with beveled surface 72 to face the bundle is preferred, as when utilizing this embodiment, the leading edge 76 of the ring 68 disrupts deposits adjacent inside surface 71 of shell 28, making it easier to remove the bundle 30 from the shell 28 in one piece. In some applications, equipping the ring with a surface such as 672 which faces the inside surface 71 of shell 28 can be the preferred embodiment, as in situations wherein the bundle is to be employed until failure. In this embodiment, the ring 68 partially collapses into the tube bundle when the bundle is pulled from the shell, due to the action of deposits against the outwardly facing beveled surface. Although collapse of the ring will damage the tube bundle, it is believed that the labor savings flowing from a quick removal of the bundle may justify utilizing this embodiment.

FIGS. 3-6 illustrate a rod baffle set advantageously employed in accordance with the present invention. Baffles 61, 63, 65 and 67 correspond to the baffles as shown in FIG. 2. The rods 66 pass through a portion of the lanes defined by the pluralities of parallel tube rows 78 and 80. The rods 66 are affixed by their ends, preferably by welding because of economics, to the ring 68 as parallel chords. The outside 70 of the ring faces the heat exchanger shell 28, while the inside 74 faces the tube bundle. The baffles shown in FIGS. 3-6 together provide radial support for each of the tubes 32 in the tube bundle. The baffles in a set cooperate longitudinally with each other via suitable longitudinal members, for example, skid bars 82. The skid bars are affixed to the ring 68 by cutting the ring and inserting the skid bar with its longitudinal dimension at right angles to the plane defined by the ring, so that the width of the skid bar forms a portion of the circumference of the ring. Generally, in the construction of a baffle cage, a plurality of rod baffles are oriented as exemplified by FIGS. 3-6 but in parallel planes and about a common axis and cooperation established between them by a plurality of skid bars 82, to form the baffle cage. The tubes 32 are inserted through the cage and affixed by their ends to a tube sheet to form a tube bundle, and the tube bundle is inserted into a heat exchanger shell 28 to form the heat exchanger.

In the embodiment of the invention wherein the rings are to collapse to a smaller diameter when the bundle is pulled from the heat exchanger shell, it is desirable to equip the rings with at least one collapsible portion to facilitate their collapse. This is conveniently accomplished by employing a hollow skid bar 182, with a relatively thin sidewall as shown best by FIG. 7. The hollow skid bar can be reinforced with a removable interior bar 183 which extends substantially the length of the hollow bar. The tube sheet is equipped with suitable apertures so that the reinforcing bar is accessible and can be removed from the bundle when it is in the heat exchanger shell. When it is desired to remove the bundle from the shell, the reinforcing rods 183 are removed from the hollow skid bars 182 so that the ring segments can collapse the hollow skid bar when the bundle is pulled from a heat exchanger shell, thereby reducing the diameter of the ring. Alternatively, relatively thin strips, for example, $\frac{1}{4}'' \times 1''$ can be employed for the skid bar, so that the skid bar will buckle or the skid bar-ring will break when the bundle is pulled from the heat exchanger shell.

Figure 7:
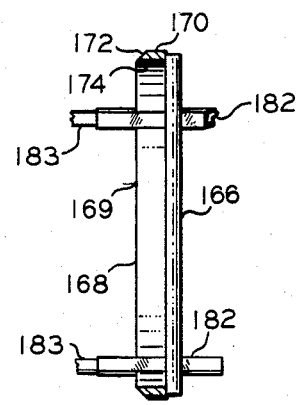
FIG. 7 is a side sectional view of a baffle 169 according to another embodiment of the present invention.

In FIG. 7, one embodiment of the invention is shown employing a rod baffle 169 with a collapsible ring. The beveled surface 172 at one end of the ring 168 is to face the interior wall of a heat exchanger shell. An inner surface 174 of the ring is to face a tube bundle, while an outer surface 170 is to face a heat exchanger shell. As shown, rod 166 is affixed as a chord to the other end of the ring, the end of the ring to which the rod is attached presenting an annular surface. As illustrated, the ring is longitudinally traversed by hollow skid bars 182, as described above, which establish cooperation with the next adjacent ring. In this embodiment, the ring 168 can be formed from, for example, $\frac{1}{2}'' \times 1\frac{1}{2}''$ bar stock, one longitudinal corner of which has been beveled. The skid bar can be formed from $\frac{1}{2}'' \times 1\frac{1}{2}''$ rectangular tube steel. The rod 166 can have a diameter of, for example, $\frac{1}{4}''$, and, when the baffle is to be used to support 1" tubes on $1\frac{1}{4}''$ square pitch spacing ($\frac{1}{4}''$ clearance between parallel tube rows), the rods are preferably affixed to ring 168 as chords on $2\frac{1}{2}''$ spacing ($2\frac{1}{4}''$ clearance between rods). In the embodiment shown, the direction of removal from the shell is toward the left of the ring. In this embodiment, deposits on the interior surface of the shell wedge against the beveled surface of the ring to collapse the ring to a smaller diameter when the tube bundle is pulled from the heat exchanger shell.

It is preferred in the present invention that the baffle means be affixed to one end of the ring, as exemplified by FIGS. 2-7 and 13. It is thus preferred that one end of the ring present an annular surface, to facilitate affixation of the baffle means. When employing rods as the baffle means in this embodiment, construction of the baffle is facilitated as the length of the rods need not be of high precision. With plate baffles, the ring can be formed and affixed to the plate, and the plate then easily trimmed to fit the outside diameter of the ring with high precision, thus avoiding corrosion prone crevices in the unit when it has been completed.

Figure 8:
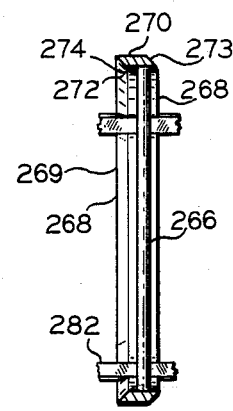
FIG. 8 is a side sectional view of a baffle 269 according to another embodiment of the present invention.

In FIG. 8, a baffle 269 is equpped with beveled surfaces on both its ends. As shown, the beveled surface 272 on one end is to face the heat exchanger shell, while the beveled surface 273 on the other end is to face the tube bundle. At least one rod 266 is affixed, for example, by welding, to the inside surface 274 of the ring 268 which is to face the tube bundle. An outside surface 270 of the ring is to face the heat exchanger shell. Each beveled surface of the ring preferably defines a frustoconical surface, preferably to converge toward the longitudinal axis of a tube bundle at about the same angle. In this embodiment, the ring has a parallelogramic cross section. Preferably, it is inserted into the heat exchanger shell with the outwardly facing beveled surface 273 first, and removed with inwardly facing beveled surface 272 first. Skid bars 282 establish cooperation between baffles in an assembly.

As shown by FIGS. 9-12, plate baffles can also be equipped with the support ring of the present invention. The plate baffles illustrated in these figures are affixed to the rings by suitable means, for example, by welds. The baffles are equipped with apertures, as is well known by those skilled in the art, to allow passage of the tubes of the bundle therethrough. Generally, the plate baffles at least partially support the tubes.

Referring to FIGS. 9 and 16, a baffle 369 is mounted in a shell 328. The baffle 369 comprises a ring 368 which at least partially surrounds a tube bundle 330 having a plurality of tubes 332 disposed within the shell 328. A baffle plate 384 is affixed to the inside surface 374 of ring 368 and at least partially extends across the diameter of the ring. If desired, the plate 384 can be affixed to the annular end of the ring opposite the bevel. The ring 368 has a beveled surface 372 facing the tube bundle 330 and intersecting at an acute angle with a surface 370 of the ring 368 which is contiguous with an inside surface 371 of heat exchanger 328.

Referring to FIGS. 10 and 14, a baffle 469 is mounted in a shell 428. The baffle 469 comprises a ring 468 which at least partially surrounds a tube bundle 430 disposed within the shell 428. Tubes 432 of the bundle pass through apertures, not shown, in a baffle plate 484 which is affixed to the inside surface 474 of ring 468 and extends at least partially across its diameter. The ring 468 has a beveled surface 472 at each of its ends which face the tube bundle 430. The beveled surfaces 472 intersect at an acute angle with a surface 470 of the ring which is contiguous with an inside surface 471 of heat exchanger shell 428.

Referring now to FIGS. 11 and 15, a baffle plate 584 is affixed to a ring 568 which has a beveled surface 572 facing an interior surface 571 of a heat exchanger shell 528 to form a baffle 569. Ring 568 extend only partially around the tube bundle 530. Tubes 532 of the bundle 530 pass through apertures (not shown) in the baffle plate 584. An exterior surface 570 of the ring 568 is contiguous to an interior surface 571 of the exchanger shell 528. The beveled surface 572 forms an obtuse angle with surface 570. Generally, the angle defined by surfaces 570 and 572 will be between about 100° and about 170°, usually between about 120° and about 150°. A leading edge 576 of the ring 568 is defined by the intersection of the beveled surface 572 of the ring and an inside surface 574 of the ring which faces the tube bundle 530.

Referring now to FIGS. 12 and 17, a baffle 669 comprises a ring 668 at least partially surrounding a tube bundle 630 of tubes 632, the ring having a baffle plate 684 affixed thereto and extending at least partially across its diameter. The ring 668 has a beveled surface 672 at each of its ends which face an interior surface 671 of a heat exchanger shell 628. An exterior surface 670 of the ring 668 is contiguous to the interior surface 671 of the heat exchanger shell 628. An inside surface 674 of the ring 668 faces the tube bundle 630.

While the present invention has been described in terms of the presently preferred embodiments, reasonable variations and modifications are possible by those skilled in the art, within the scope of the described invention and the appended claims.

What is claimed is:

1. Apparatus comprising:
   (a) an at least partially closed ring to be positioned in a plane perpendicular the axis of a heat exchanger having a tube bundle and shell, said ring having a first surface to be positioned contiguous to the inside surface of a heat exchanger shell and at least one of (1) a first frustoconical beveled surface facing the tube bundle which intersects with said first surface at an angle wherein an acute angle is formed between said first surface and said first beveled surface and (2) an obtuse angle is formed by a second frustoconical beveled surface facing toward the interior surface of said heat exchanger's shell which intersects with said first surface at an angle wherein an obtuse angle is formed between said first surface and said second frustoconical beveled surface; and
   (b) baffle means in cooperation with and at least partially surrounded by and affixed to said ring.

2. Apparatus as in claim 1 wherein the ring is closed and the baffle means comprise a plurality of parallel rods affixed to the ring as a plurality of parallel chords.

3. Apparatus as in claim 1 wherein the ring is closed and the baffle means comprise at least one plate which at least partially traverses the diameter of the ring.

4. Apparatus comprising:
   (a) a plurality of parallel tubes arranged to form tube bundle;
   (b) tube support means at leat partially traversing the longitudinal dimension of the tube bundle to support the tubes; and
   (c) at least one at least partially closed ring in cooperation with and affixed to the tube support means and at least partially surrounding the tube bundle, said at least one ring positioned in a plane perpendicular of the axis of a heat exchanger shell used to contain said tube bundle, said ring having a first surface to be positioned contiguous to the inside surface of a shell employed to contain said tube bundle and at least one of (1) a first frustoconical beveled surface facing the tube bundle which intersects with the first surface at an angle wherein an acute angle is formed with said first surface and (2) a second beveled surface facing toward the interior surface of said heat exchanger shell which intersects with said first surface at an angle wherein an obtuse angle is formed between said first surface and said second beveled surface.

5. Apparatus as in claim 4 wherein the at least one beveled surface of the at least one ring defines at least a portion of a frustoconical shape.

6. Apparatus as in claim 5 wherein the at least one beveled surface of the at least one ring converges toward the longitudinal axis of the tube bundle at a half angle of between about 10° and about 80°.

7. Apparatus as in claim 6 wherein the at least one beveled surface of the at least one ring converges toward the longitudinal axis of the tube bundle at a half angle of between about 30° and 60°.

8. Apparatus as in claim 7 wherein there is a single beveled surface on each ring and the beveled surface faces the shell.

9. Apparatus as in claim 7 where there is a single beveled surface on each ring and the beveled surface faces the tube bundle.

10. Apparatus as in claim 7 wherein there are two beveled surfaces on each ring and both of said beveled surfaces face the shell.

11. Apparatus as in claim 7 wherein there are two beveled surfaces on each ring and both of said beveled surfaces face the tube bundle.

12. Apparatus as in claim 7 wherein there are two beveled surfaces on each ring and every ring has a parallelogramic cross-section with identical orientation of the parallelogramic cross-sections.

13. Apparatus as in claim 8 wherein there is a plurality of rings with at least one ring having a collapsible portion so that the ring is collapsible to a smaller diameter.

14. Apparatus as in claim 10 wherein there is a plurality of rings with at least one ring having a collapsible portion so that the ring is collapsible to a smaller diameter.

15. Apparatus as in claim 12 wherein there is a plurality of rings with at least one ring having a collapsible portion so that the ring is collapsible to a smaller diameter.

16. Apparatus as in claim 9 wherein there is a plurality of rings with at least one longitudinal member affixed to and traversing at least a portion of each of the plurality of rings, said longitudinal member running in parallel to the common axis about which the baffles are centered.

17. Apparatus as in claim 11 wherein there is a plurality of rings with at least one longitudinal member affixed to and traversing at least a portion of each of the plurality of rings, said longitudinal member running in parallel to the common axis about which the baffles are centered.

18. Apparatus as in claim 13 wherein there is a plurality of rings with at least one longitudinal member affixed to and traversing at least a portion of each of the plurality of rings, said longitudinal member running in parallel to the common axis about which the baffles are centered.

19. Apparatus as in claim 14 wherein there is a plurality of rings with at least one longitudinal member affixed to and traversing at least a portion of each of the plurality of rings, said longitudinal member running in parallel to the common axis about which the baffles are centered.

20. Apparatus as in claim 15 wherein there is a plurality of rings with at least one longitudinal member affixed to and traversing at least a portion of each of the plurality of rings, said longitudinal member running in parallel to the common axis about which the baffles are centered.

21. Apparatus comprising:
(a) a plurality of baffles centered about a common axis and arranged in a plurality of parallel planes, said planes to be positioned perpendicular to the axis of a heat exchanger having a tube bundle and shell, each baffle comprising an at least partially closed ring affixed thereto having a first surface to be positioned contiguous to the inside surface of a heat exchange shell and at least one of (1) a frustoconical beveled surface facing the tube bundle which intersects with the first surface at an angle wherein an acute angle is formed with said first surface and (2) a second beveled surface facing toward the interior surface of said heat exchanger shell which intersects with said first surface at an angle wherein an obtuse angle is formed between said first surface and said second beveled surface and a multiplicity of rods affixed to said ring as a multiplicity of parallel cords and
(b) at least one longitudinal member affixed to and traversing at least a portion of each of the plurality of rings, said longitudinal member running in parallel to the common axis about which the baffles are centered.

22. Apparatus as in claim 21 wherein the at least one beveled surface of the at least one ring defines at least a portion of a frustoconical shape.

23. Apparatus of claim 22 wherein the at least one beveled surface of the at least one ring converges toward the longitudinal axis of the tube bundle at a half angle of between 10° and about 80°.

24. Apparatus of claim 23 wherein the at least one beveled surface of the at least one ring converges toward the longitudinal axis of the tube bundle at a half angle of between 30° and about 60°.

25. Apparatus of claim 24 wherein there is a single beveled surface on each ring and the beveled surface faces the shell.

26. Apparatus as in claim 24 wherein there is a single beveled surface on each ring and the beveled surfaces faces the tube bundle.

27. Apparatus as in claim 24 wherein there are two beveled surfaces on each ring and both of said beveled surfaces face the shell.

28. Apparatus as in claim 24 wherein there are two beveled surfaces on each ring and both of said beveled surfaces face the tube bundle.

29. Apparatus as in claim 24 wherein there are two beveled surfaces on each ring and every ring has a parallelogramic cross-section with identical orientation of the parallelogramic cross-sections.

30. Apparatus as in claim 24 wherein there is a plurality of rings with at least one ring having a collapsible portion so that the ring is collapsible to a smaller diameter.

31. Apparatus as in claim 27 wherein there is a plurality of rings with at least one ring having a collapsible portion so that the ring is collapsible to a smaller diameter.

32. Apparatus as in claim 29 wherein there is a plurality of rings with at least one ring having a collapsible portion so that the ring is collapsible to a smaller diameter.

* * * * *